W. Trowbridge.
Cotton Bale Tie.

№ 75319                    Patented Mar. 10, 1868.

Witnesses:
Wm E. Sewey
Rufus R. Rhodes

Inventor:
Wm Trowbridge

UNITED STATES PATENT OFFICE.

WILLIAM TROWBRIDGE, OF NEW ORLEANS, LOUISIANA.

IMPROVEMENT IN COTTON-BALE TIES.

Specification forming part of Letters Patent No. 75,319, dated March 10, 1868.

*To all whom it may concern:*

Be it known that I, WILLIAM TROWBRIDGE, of the city of New Orleans, parish of Orleans, and State of Louisiana, have invented a certain new, useful, and improved device for fastening the ends of wire or wire-rope together, when the same is used for banding cotton or other bales; and I do hereby declare the following to be a full, clear, and exact description of the same, reference being had to the annexed drawings, making a part of this specification, in which—

Figure 1:
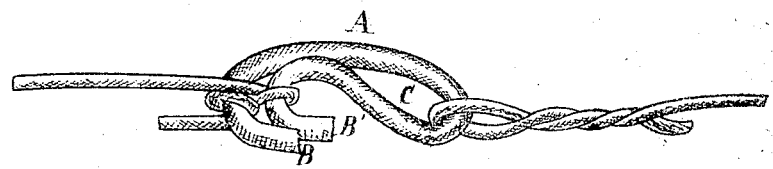
Figure 2:
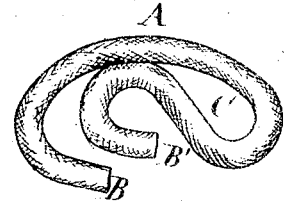

Figure 1 is a view of the device as when fastening together the ends of a band, and Fig. 2 is a detached view of the device.

My invention consists, simply, of a section or piece of iron wire, somewhat larger than the wire that is to be used in connection with it, in order to prevent a too abrupt bending of the band in attaching the two together, that is so bent or formed as to present two hooks at one of its ends and a loop or eye at the other; but my invention will be better understood and more readily explained by referring to the drawings, on which—

A is a piece of wire about three and a half or four inches long. B B' are the hooks, and C the loop or eye, to which I have referred.

My device is formed by a machine especially constructed for the purpose, which, at a single operation, cuts the wire the right length, and puts it into the shape as shown on the drawings.

In applying my invention to actual use, one end of the band is first fastened to it by passing the same through eye C, and then folding it over and twisting it, as is shown at Fig. 1. This attachment of the device to one end of the band may be done at the factory or on the plantation. This being done, the band is made to encircle the bale, and the other end of it is fastened to the device by passing it alternately over or around the hooks, as shown on the drawings. No twisting of the loose end of the band that is attached to the device is necessary to secure the fastening, and hence there is no difficulty in taking the band off the bale without cutting it, whenever the bale is to be broken up.

This peculiarity constitutes one of the points of greatest comparative merit in my invention, for it secures the band for repeated use, which is not the case with those devices that require the twisting of both ends of the band in order to establish the fastening.

My device may be made as cheaply as any in existence, and there is none other that is simpler, nor easier of adjustment to practice.

Having thus described my invention, what I claim, and desire to secure by Letters Patent, is—

The device herein described—to wit, a section or piece of wire so formed as to be provided with the loop or eye C, and the hooks B and B', as herein described, for the purpose set forth.

WM. TROWBRIDGE.

Witnesses:
WM. E. JEWEY,
RUFUS R. RHODES.